United States Patent Office 3,634,491
Patented Jan. 11, 1972

3,634,491
PROCESS FOR THE PREPARATION OF 3,5-DI-ALKYL RESORCYLIC ACIDS AND ESTERS
James Douglas Grossman, Madison Township, Middlesex County, and Robert Santora De Simone, Old Bridge, N.J., and Lambertus Gerke Heeringa, Amsterdam, Netherlands, assignors to International Flavors & Fragrances, Inc., New York, N.Y.
No Drawing. Filed Aug. 30, 1968, Ser. No. 756,375
Int. Cl. C07c 69/78
U.S. Cl. 260—473 R  6 Claims

ABSTRACT OF THE DISCLOSURE

Process for the preparation of di-alkyl ring-substituted resorcylic acids and esters thereof which comprises reacting a di-alkyl ring-substituted dihydro resorcyclic acid or ester with an oxidative chlorine source. Certain novel dialkyl ring substituted resorcylic acids and esters which are useful in perfumery are obtained.

BACKGROUND OF THE INVENTION

Natural oakmoss is commercially important in producing high-grade fragrance compositions. Oakmoss constitutes an important and basic part of the fragrance impression of chypre and lavender. In view of the limited availability of natural oakmoss synthetic substitutes are desirable and have been long sought.

It has been found that certain di-alkyl ring-substituted resorcylic acids and esters thereof simulate and resemble the fragrance impression of oakmoss. While a number of routes for the production of such resorcylic acids and esters thereof are available, they are rather tedious, complicated and generally uneconomic. For instance, one of these methods, as reported by A. Sonn in Berichte, 62B, 3012–6 (1929), involves utilization of the rather expensive, and difficulty recoverable, palladium catalyst for the aromaticization of mono- or dialkyl ring-substituted dihydro resorcylate. Another method shown by Robertson et al. in J. Chem. Soc., pp. 313–20 (1930) involves a multi-step sequence difficult to perform and tedious to carry out.

THE INVENTION

The invention thus raltes to di-alkyl ring-substituted resorcylic acids and esters thereof, their mode of preparation, and their use as fragrance materials.

The novel dialkyl ring-substituted resorcylic acids and esters thereof of this invention may be represented by the following formula:

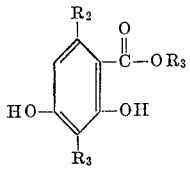

wherein each of $R_1$ and $R_2$ is a lower alkyl radical containing from about 1 to 5 carbon atoms and at least one of $R_1$ or $R_2$ contains two or more carbon atoms and wherein $R_3$ is hydrogen or a lower alkyl radical preferably containing about 1 to 3 carbon atoms. Representative of the compounds included within said formula are:

methyl 3-methyl-6-isopropyl-resorcylate
methyl 3-isopropyl-6-methyl-resorcylate
methyl 3,6-diethyl-resorcylate
methyl 3-methyl-6-n-butyl-resorcylate
methyl 3,6-di-n-propyl-resorcylate
methyl 3,6-di-isobutyl-resorcylate
methyl 3,6-di-n-butyl-resorcylate
ethyl 3-n-propyl-6-methyl-resorcylate
3,6-di-isopropyl resorcylic acid
methyl 3-methyl-6-ethyl-resorcylate
methyl 3-ethyl-6-methyl-resorcylate The resorcylic acids and esters of this invention effectively simulate and resemble oakmoss fragrance and are suitable for use by themselves as fragrance materials or in combination with other ingredients in a perfume composition such as a chypre or lavender perfume. The resorcylic esters are preferred as fragrance materials and the methyl esters are most suitable. Particularly preferred is methyl 3-ethyl-6-methyl-resorcylate by reason of its pronounced and long lasting mousse-like odor.

Also, in accordance with this invention it has been found di-alkyl ring-substituted resorcylic acid and esters thereof, as represented by the formula

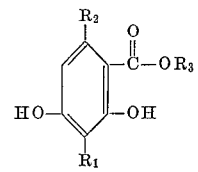

wherein $R_3$ is hydrogen or a lower alkyl radical containing from about 1 to 5 carbon atoms and both $R_1$ and $R_2$ is such an alkyl radical, can be conveniently and more economically prepared by reacting a mono- or di-alkyl ring-substituted dihydroresorcylate ester with an oxidative chlorine material. This process has been found to result in high yield of the products desired and suppresses undesirable side reactions.

Suitable di-alkyl ring-substituted dihydro resorcylic acids and esters for this reaction may be represented by the following formulae:

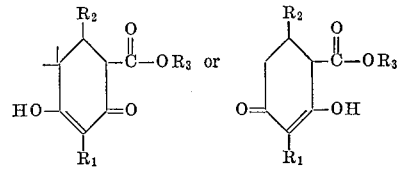

wherein $R_3$ is hydrogen or a lower alkyl radical containing from about 1 to 5 carbon atoms including methyl, ethyl, propyl, butyl, isopropyl and amyl, and both $R_1$ and $R_2$ is such a loler alkyl radical. Mixtures of such isomers can be used. The particular starting material selected will depend upon the end product desired and appropriate choices will be readily apparent. The dihydroresorcylate starting material is preferably substantially pure so as to avoid undesirable side reactions and facilitate isolation and recovery of the end product. Such dihydroresorcylic acid or ester starting materials may be prepared by any of the known techniques. For example, such dihydro-resorcylic acids or esters can be readily made by reacting a beta-keto alkanoic acid or ester of the formula

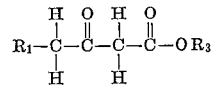

with an alkyl alpha, beta alkenoate of the formula

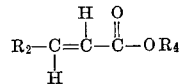

in the presence of an alkali metal alcoholate such as sodium methylate. In the above formulae $R_1$, $R_2$, $R_3$ have the meanings heretofore given and $R_4$ is a lower alkyl radical. A further description of the preparation of the intermediate dihydroresorcylic acids and esters may be found in A. Sonn, Berichte, 62B, 3012–6 (1929).

The oxidative chlorine material may be molecular chlorine or any material which, under the conditions of the reaction, yields or is a source of oxidative chlorine such as hypochlorous acid or nitrosyl chloride. Chlorine is preferred.

The yield obtained when practicing the process of this invention is affected by the degree of contact of the reactants. Thus, if the contact time of the oxidative chlorine material with the dihydro-resorcylic acid or ester is too low, the yields are lower and large amounts of unreacted dihydro-resorcylic acid or ester remains unconverted and must be separated from the reaction mixture. Intermixing of the reactants as by agitation or turbulent mixing will decrease the contact time required and increase the yield of desired product.

When hypochlorous acid is employed a two phase aqueous-non-aqueous reaction system results whereby the degree of contact between the two phases is an important if not controlling factor in determining the yield of product. The degree of contact is modified or regulated by nature of the agitation or intermixing.

It is generally desirable to carry out the reaction in an inert solvent for the dihydro-resorcylate since at the reaction temperatures usually preferred, i.e. from about 20–30° C., the reactant is in solid form. Such a solvent medium, therefore, is useful to effect adequate contact between the reactants. Suitable inert reaction solvents include non-reactive halogenated hydrocarbons such as chloroform and tetrachloroethane.

The reaction conditions of temperature and pressure will depend upon a variety of factors including the time of the reaction, the particular reactants used, and the products desired. Generally, it is expedient to run the reaction at atmospheric pressure although elevated pressures may be employed. The reaction is conducted in the range of from about 15°–50° C., and preferably in the range of from about 20–30° C., although variations from these temperatures are permissible. The time of reaction is generally determined by the temperature of the reaction and by the absolute pressure above the reaction mass. Other factors such as the nature of the reactants, the extent and duration of contact of the reactants, the mixing system utilized, and the yield and conversions desired may also affect the reaction time. It is usually preferred to carry out the reaction in from about one to ten hours since shorter periods adversely affect yields while longer periods give no further advantage in the process.

The process is suitably carried out by dissolving or suspending the dihydro-resorcylic acid or ester in an inert organic solvent such as chloroform, whereby a two phase slurry of solid and saturated solution is formed. The oxidative chlorine material, as for example chlorine gas, is introduced into the reaction system, as by bubbling it through the reaction mass, while vigorously agitating the reaction system to achieve intimate intermixing. Introduction of the oxidative chlorine material is discontinued when chlorine is no longer taken up and the reaction mixture becomes clear. The organic solvent or vehicle is then removed from the reaction mass, the reactants separated and the reaction product may be recovered and isolated by any conventional technique such as distillation, selective extraction, or the like.

The dialkyl resorcylic acids and esters thereof obtained by practicing the processes, particularly the novel materials of this invention, are useful fragrance materials. In perfume compositions, i.e. a mixture of compounds including for example, natural oils, synthetic oils, aldehydes, ketones, esters, lactones, alcohols, and frequently hydrocarbons, the resorcylic acid or ester thereof contributes its particular olfactory characteristics. The overall effect of the perfume composition can be more than the effect of each ingredient. Thus, the individual resorcylic acid or ester may be used to alter the aroma characteristics of a perfume composition, for example, by highlighting or moderating the olfactory contribution or another ingredient of the composition.

Perfume compositions containing the resorcylic acid or ester of this invention or the novel materials themselves can be used in conjunction with carriers, vehicles, solvents, dispersants, emulsifiers, surface-active agents, aerosol propellants, fixatives, and the like.

The amounts of the resorcylic acid or ester of this invention which will be effective in perfume compositions depends upon several factors, including the other ingredients of the composition, their amounts and the particular effects which are desired. It has been found that perfume compositions containing as little as 0.5% by weight of the compound of the invention, or even less, can be used to impart a basic oakmoss note to such materials as lavender, or chypre for use in soaps, cosmetics, lotions, handkerchief perfumes and similar products. The amount employed will depend on considerations of cost, nature of the end product, the effect desired on the finished product and the particular fragrance sought.

The following examples serve to illustrate embodiments of the invention as it is now preferred to practice it. It will be understood that these examples are illustrative and the invention is to be considered restricted thereto only as indicated in the appended claims.

Example I.—Preparation of methyl 3,6-dimethyl-resorcylate

Into a 5 liter reaction flask equipped with a stirrer, thermometer, reflux condenser, a gas bubbler inlet tube and outlet are placed 450 grams methyl 3,6-dimethyl-di-hydro-resorcylate suspended in 2.5 liters of $CHCl_3$. Chlorine gas at atmospheric pressure and room temperature is bubbled through the gas bubbler into the ingredients in the reaction vessel. The chlorine gas is added until no more chlorine gas is taken into solution and the solution becomes clear. The reaction vessel is stirred continuously during the bubbling of the chlorine gas. The stirring is continued after the cessation of the bubbling and until hydrogen chlorine evolution ceases. The chloroform solvent is stripped from the reaction mass yielding a solid product having a weight of 476.3 grams. This solid is mixed with diethylether and the resulting mixture is placed into a separatory funnel. The reaction mass is subjected to a bicarbonate extraction to recover starting material. The ether mixture is washed twice with 10% aqueous sodium hydroxide. The resulting aqueous phase is acidified with hydrochloric acid and cooled to 0° C. Additional hydrochloric acid is added until the pH of this phase is reduced to 2. The precipitate formed during the addition of acid is filtered and washed twice with water and dried. The dried product has a weight of 224.4 grams. Infrared, NMR and mass spectral analysis verifies that the product is methyl 3,6-dimethyl-resorcylate. The product's melting range is 130.8–136.6° C. The material has a mousse-like odor which can be imparted to soap at a level of ¼%. The yield is 50.4% and the conversion is 75.0% taking into account unreacted reactant.

Example II.—Methyl 3-isopropyl-6-methyl-resorcylate

Into a 2 liter round bottom flask equipped with stirrer, thermometer, inlet gas bubbler and outlet, the following ingredients are placed: 211 grams of methyl 3-isopropyl-6-methyl dihydro-resorcylate 1000 ml. of chloroform. Chlorine gas is bubbled through the reaction mixture at atmospheric pressure and room temperature until the chlorine no longer dissolves in the reaction mass. The reaction mass is concentrated in a flash evaporator to yield an oil that turns solid on standing. The solid material is dissolved in ether and the ether solution is washed with a saturated aqueous solution of sodium bicarbonate until the aqueous wash remains basic and evolution of $CO_2$ ceases. The ether solution is extracted with 10% sodium hydroxide at about 50° C. and the extracts are filtered on vacuum to remove traces of ether. The ether-free caustic extract is neutralized with concentrated hydrochloric acid at 5° C. to a pH of 2. A gummy mass forms and turns solid on standing at 0° C. The solid is dissolved in methanol, discolorized with charcoal, and recrystallized from a methanol-water mixture. The solid is dried, yielding a product weighing 36.2 grams. This product is identified by NMR and mass spectral analysis as methyl 3-isopropyl-6-methyl-resorcylate having a melting range of 125.6° C.–135.8° C., and the following mass spectral data: 178, 192, 164, 224, and 226 (parent peak).

Example III.—Methyl 3-ethyl-6-methyl-resorcylate

The process as described in Example I is carried out to obtain methyl 3-ethyl-6-methyl resorcylate by substituting methyl 3-ethyl-6-methyl-dihydroresorcylate for the methyl 3,6-dimethyl dihydroresorcylate used in Example I. The product has a fruity and caramel-like top note and its basic note is mousse-like. Its mass spectral data are: peaks at 163, 178, 210 (parent peak).

Example IV.—Methyl 3-n-propyl-6-methyl-resorcylate

The process as described in Example I is carried out to obtain methyl 3-n-propyl-6-methyl-resorcylate by substituting methyl 3-n-propyl-6-methyl-dihydroresorcylate for the dihydro-resorcylate used in Example I. The product obtained has a melting range of 133.2°–134.6° C. and a basic mousse olfactory note.

Example V.—Methyl 3-isobutyl-6-methyl-resorcylate

The process as described in Example I is carried out to obtain methyl 3-isobutyl-6-methyl-resorcylate by substituting methyl 3-isobutyl-6-methyl dihydro-resorcylate for the dihydro-resorcylate used in Example I. The product obtained has a basic mousse olfactory character and a melting range of 127.4°–128.6° C.

Example VI.—Methyl 3-n-butyl-6-methyl-resorcylate

The process as described in Example I is carried out to obtain methyl 3-n-butyl-6-methyl-resorcylate by substituting methyl 3 - n-butyl-6-methyl-dihydro-resorcylate for the dihydro-resorcylate used in Example I. The product obtained has a mousse olfactory note.

Example VII.—Perfume composition

The following mixture is prepared:

| Ingredient: | Grams |
|---|---|
| Jasmin liquid, A | 15 |
| Rose liquid | 5 |
| Solution orris | 6 |
| Santal oil E. I. | 6 |
| Bergamot | 120 |
| Patchouli oil | 6 |
| Musk ketone, ⅕ in B.B. | 60 |
| Vetivert oil | 5 |
| Methyl 3 -ethyl-6-methyl-resorcylate [Tincture ⅓] | 200 |
| Coumarin | 2 |
| Vanillin | 1.5 |
| Heliotropin | 2 |
| Rose synthetic | 25 |
| Rose otto, Bulgarian | 10 |
| Pimento oil | 5 |
| Olibanum resinoid | 10 |
| Bitter orange oil | 4 |
| Ambrette seed oil | 2 |
| Musk tincture, 3 percent | 250 |
| Alcohol | 4000 |
| | 4734 |

The foregoing perfume formulation is an important part of chypre essence. The methyl 3-ethyl-6-methyl-resorcylate is used as a replacement for oakmoss. This perfume is incorporated into a handkerchief perfume at the 0.1% by weight level. The methyl 3-ethyl-6-methyl-resorcylate gives to this fragrance a natural and distinctly oakmoss note.

Example VIII.—Perfume composition

The following mixture is prepared:

| Ingredient: | Grams |
|---|---|
| Benzyl acetate | 50 |
| Rosewood | 100 |
| Cedarwood | 150 |
| Linalyl acetate | 100 |
| α-Ionone | 80 |
| Ethyl cinnamate | 20 |
| Amyl cinnamic aldehyde | 50 |
| Iso-eugenol | 50 |
| Coumarin | 100 |
| Methyl 3-isopropyl-6-methyl resorcylate | 50 |
| Musk xylene | 50 |
| Styrax resin | 100 |

The foregoing perfume formulation is an important part of chypre essence. The methyl 3-isopropyl-6-methyl-resorcylate is used as a replacement for oakmoss. This perfume is incorporated into a soap perfume at the 0.1% level. The methyl 3-isopropyl-6-methyl-resorcylate gives to this fragrance a natural and distinctly oakmoss note.

Example IX.—Perfume composition

The following mixture is prepared:

| Ingredient: | Grams |
|---|---|
| Benzyl acetate | 50 |
| Rosewood | 100 |
| Cedarwood | 150 |
| Linalyl acetate | 100 |
| α-Ionone | 80 |
| Ethyl cinnamate | 20 |
| Amyl cinnamic aldehyde | 50 |
| Iso-eugenol | 50 |
| Coumarin | 100 |
| Methyl 3-n-butyl-6-methyl-resorcylate | 200 |
| Musk xylene | 50 |
| Styrax resin | 100 |

The foregoing perfume formulation is an important part of chypre essence. The methyl 3-n-butyl-6-methyl-resorcylate is used as a replacement for oakmoss. This perfume is incorporated into a soap perfume at the 0.1% level. The methyl 3-n-butyl-6-methyl-resorcylate gives to this fragrance a natural and distinctly oakmoss note.

What is claimed is:

1. A process for preparing an alkyl ring-substituted resorcylic acid or ester thereof having the formula

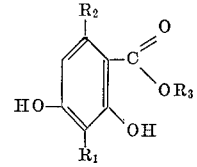

which comprises reacting the corresponding dihydro-resorcylic compound of the formulae

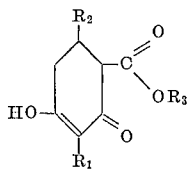 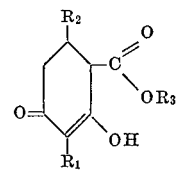

or mixtures thereof with an oxidative chlorine material selected from the group consisting of chlorine, hypochlorous acid, and nitrosyl chloride, and wherein $R_3$ in the above formulae is hydrogen or a lower alkyl radical containing from 1 to 5 carbon atoms and both $R_1$ and $R_2$ is such an alkyl radical.

2. The process of claim 1 wherein the oxidative chlorine source is molecular chlorine.

3. The process of claim 1 wherein each of $R_1$, $R_2$ and $R_3$ is methyl.

4. The process of claim 3 wherein the oxidative chlorine source is molecular chlorine.

5. The process of claim 1 wherein $R_1$ is isopropyl and each of $R_2$ and $R_3$ is methyl.

6. The process of claim 1 wherein $R_1$ is ethyl and each of $R_2$ and $R_3$ is methyl.

References Cited

Smith et al.: J. Am. Chem. Soc., 74, 3305 (1952).
Walley: Chem. Abstr., 44, 4879f (1950).
Wessely et al.: Chem. Abst., 46, 11152c (1952).

LORRAINE A. WEINBERGER, Primary Examiner

J. F. TERAPANE, Assistant Examiner

U.S. Cl. X.R.

252—522; 260—468 R, 514 R, 521 R

UNITED STATES PATENT OFFICE
CERTIFICATE OF CORRECTION

Patent No. 3,634,491      Dated   January 11, 1972

Inventor(s)   JAMES DOUGLAS GROSSMAN et al

It is certified that error appears in the above-identified patent and that said Letters Patent are hereby corrected as shown below:

Column 1, line 4, change "Madison Township" to --Old Bridge--
          line 5, change "Old Bridge" to --Madison Township--

Column 1, line 38, change "difficulty" to --difficultly--

Column 1, line 46, change "raltes" to --relates--

Column 2, line 15, insert --that-- after "found" and before "di-alkyl"

Column 2, lines 35 to 43, change the first structural formula from

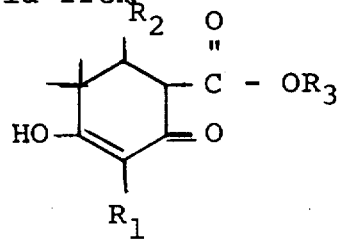

to read as follows:

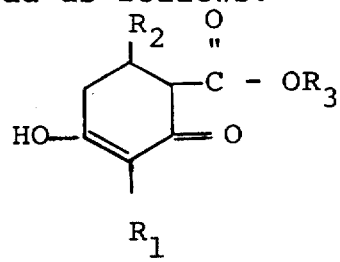

Column 2, line 47, change "loler" to --lower--

Signed and sealed this 11th day of July 1972.

(SEAL)
Attest:

EDWARD M. FLETCHER, JR.         ROBERT GOTTSCHALK
Attesting Officer               Commissioner of Patents